(12) United States Patent
Pearson et al.

(10) Patent No.: US 9,477,773 B2
(45) Date of Patent: *Oct. 25, 2016

(54) AUTOMATED SELECTION OF IMAGES FOR WEB PAGES

(71) Applicant: eBay Inc., San Jose, CA (US)

(72) Inventors: Jennifer Pearson, San Jose, CA (US); Hsiaozhang Bill Wang, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,152

(22) Filed: Aug. 24, 2015

(65) Prior Publication Data

US 2015/0363506 A1 Dec. 17, 2015

Related U.S. Application Data

(60) Continuation of application No. 13/717,394, filed on Dec. 17, 2012, now Pat. No. 9,116,868, which is a continuation of application No. 12/620,450, filed on Nov. 17, 2009, now Pat. No. 8,335,983, which is a division of application No. 09/589,585, filed on Jun. 7, 2000, now Pat. No. 7,673,229.

(51) Int. Cl.
*G06F 17/22* (2006.01)
*G06F 17/30* (2006.01)
(Continued)

(52) U.S. Cl.
CPC ....... *G06F 17/30896* (2013.01); *G06F 17/218* (2013.01); *G06F 17/24* (2013.01); *G06F 17/30268* (2013.01); *G06Q 30/08* (2013.01)

(58) Field of Classification Search
CPC ............. G06F 17/30896; G06F 17/24; G06F 17/30038; G06F 17/3089; G06F 17/218; G06F 17/30268; G06F 17/30269; G06Q 30/08; G06Q 10/101; G06Q 30/02
See application file for complete search history.

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

CA 2253543 A1 3/1997
CA 2180995 A1 1/1998
(Continued)

OTHER PUBLICATIONS

"AOL Picture Tutorial", [Online]. Retrieved from the Internet: <URL: http://web.archive.org/web/19990222102953/www.twaze.com/aolpix>, (Archived Feb. 22, 1999), 19 pgs.
(Continued)

*Primary Examiner* — Maikhanh Nguyen
(74) *Attorney, Agent, or Firm* — Schwegman, Lundberg & Woessner, P.A.

(57) ABSTRACT

In various embodiments, a method, a system, and a computer-readable medium are disclosed for creating a pool of images available for display, such as in one or more web pages. In one embodiment, a method is disclosed that includes selecting images for a markup language document by determining a pre-determined number, N, of images to display in the markup language document, encoding an instruction in the markup language document to be executed by one or more hardware-based processors to select N images for insertion into the markup language document, retrieving the N images from a group of images, and placing the N retrieved images in the markup language document. Other embodiments are also disclosed.

16 Claims, 6 Drawing Sheets

(51) Int. Cl.
  *G06Q 30/08* (2012.01)
  *G06F 17/24* (2006.01)
  *G06F 17/21* (2006.01)

(56) References Cited

U.S. PATENT DOCUMENTS

| | | |
|---|---|---|
| 3,751,152 A | 8/1973 | Rinehart |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,715,453 A | 2/1998 | Stewart |
| 5,717,989 A | 2/1998 | Tozzoli et al. |
| 5,722,418 A | 3/1998 | Bro |
| 5,727,165 A | 3/1998 | Ordish et al. |
| 5,737,599 A | 4/1998 | Rowe et al. |
| 5,745,681 A | 4/1998 | Levine et al. |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,210 A | 8/1998 | Goldhaber et al. |
| 5,794,216 A | 8/1998 | Brown |
| 5,794,219 A | 8/1998 | Brown |
| 5,796,395 A | 8/1998 | de Hond |
| 5,799,284 A | 8/1998 | Bourquin |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,712 A | 11/1998 | DuFresne |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,973 A | 5/1999 | Yonezawa et al. |
| 5,905,974 A | 5/1999 | Fraser et al. |
| 5,905,975 A | 5/1999 | Ausubel |
| 5,915,038 A | 6/1999 | Abdel-Mottaleb et al. |
| 5,918,236 A | 6/1999 | Wical |
| 5,920,685 A | 7/1999 | Romano et al. |
| 5,922,074 A | 7/1999 | Richard et al. |
| 5,924,072 A | 7/1999 | Havens |
| 5,926,794 A | 7/1999 | Fethe |
| 5,948,061 A | 9/1999 | Merriman et al. |
| 5,956,709 A | 9/1999 | Xue et al. |
| 5,974,412 A | 10/1999 | Hazlehurst et al. |
| 5,986,662 A | 11/1999 | Argiro et al. |
| 5,991,739 A | 11/1999 | Cupps et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,399 A | 5/2000 | Morag |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,085,176 A | 7/2000 | Woolston |
| 6,085,229 A | 7/2000 | Newman et al. |
| 6,104,815 A | 8/2000 | Alcorn et al. |
| 6,119,135 A | 9/2000 | Helfman |
| 6,119,137 A | 9/2000 | Smith et al. |
| 6,128,649 A | 10/2000 | Smith et al. |
| 6,154,755 A | 11/2000 | Dellert et al. |
| 6,167,382 A | 12/2000 | Sparks et al. |
| 6,178,408 B1 | 1/2001 | Copple et al. |
| 6,182,050 B1 | 1/2001 | Ballard |
| 6,185,558 B1 | 2/2001 | Bowman et al. |
| 6,192,407 B1 | 2/2001 | Smith et al. |
| 6,195,107 B1 | 2/2001 | Iverson |
| 6,202,051 B1 | 3/2001 | Woolston |
| 6,237,010 B1 | 5/2001 | Hui et al. |
| 6,243,691 B1 | 6/2001 | Fisher et al. |
| 6,252,612 B1 | 6/2001 | Jeddeloh |
| 6,269,238 B1 | 7/2001 | Iggulden |
| 6,272,472 B1 | 8/2001 | Danneels et al. |
| 6,275,829 B1 | 8/2001 | Angiulo et al. |
| 6,317,722 B1 | 11/2001 | Jacobi et al. |
| 6,356,283 B1 | 3/2002 | Guedalia |
| 6,366,899 B1 | 4/2002 | Kernz |
| 6,415,320 B1 | 7/2002 | Hess et al. |
| 6,484,149 B1 | 11/2002 | Jammes et al. |
| 6,504,571 B1 | 1/2003 | Narayanaswami et al. |
| 6,507,841 B2 | 1/2003 | Riverieulx de Varax |
| 6,510,462 B2 | 1/2003 | Blumenau |
| 6,591,248 B1 | 7/2003 | Nakamura et al. |
| 6,654,725 B1 | 11/2003 | Langheinrich et al. |
| 6,693,652 B1 | 2/2004 | Barrus et al. |
| 6,704,797 B1 | 3/2004 | Fields et al. |
| 6,732,161 B1 | 5/2004 | Hess et al. |
| 6,785,671 B1 | 8/2004 | Bailey et al. |
| 6,850,899 B1 | 2/2005 | Chow et al. |
| 6,925,444 B1 | 8/2005 | McCollom et al. |
| 7,007,076 B1 | 2/2006 | Hess et al. |
| 7,162,446 B1 | 1/2007 | Handler |
| 7,188,137 B2 | 3/2007 | Inoue et al. |
| 7,197,475 B1 | 3/2007 | Lorenzen et al. |
| 7,216,092 B1 | 5/2007 | Weber et al. |
| 7,418,483 B2 | 8/2008 | Hess et al. |
| 7,499,979 B2 | 3/2009 | Hess et al. |
| 7,512,548 B1 | 3/2009 | Bezos et al. |
| 7,673,229 B1 | 3/2010 | Pearson et al. |
| 7,827,075 B2 | 11/2010 | Hess et al. |
| 7,912,925 B2 | 3/2011 | Hess et al. |
| 8,255,478 B2 | 8/2012 | Hess et al. |

(56) References Cited

U.S. PATENT DOCUMENTS

| | | |
|---|---|---|
| 8,335,983 B2 | 12/2012 | Pearson et al. |
| 9,116,868 B2 | 8/2015 | Pearson et al. |
| 2001/0014184 A1 | 8/2001 | Bubie et al. |
| 2002/0054049 A1 | 5/2002 | Toyoda et al. |
| 2003/0208560 A1 | 11/2003 | Inoue et al. |
| 2006/0101131 A1 | 5/2006 | Hess et al. |
| 2006/0206795 A1 | 9/2006 | Hess et al. |
| 2009/0113347 A1 | 4/2009 | Hess et al. |
| 2009/0192919 A1 | 7/2009 | Hess et al. |
| 2010/0070841 A1 | 3/2010 | Pearson et al. |
| 2011/0229050 A1 | 9/2011 | Hess et al. |
| 2013/0111314 A1 | 5/2013 | Pearson et al. |

FOREIGN PATENT DOCUMENTS

| | | |
|---|---|---|
| EP | 1131724 A1 | 9/2001 |
| FR | 2658635 A1 | 8/1991 |
| JP | 08335265 A | 12/1996 |
| JP | 10232658 A | 9/1998 |
| JP | 11114218 A | 4/1999 |
| JP | 2001239018 A | 9/2001 |
| JP | 4936628 B2 | 5/2012 |
| NL | 9300266 A | 9/1994 |
| WO | WO-9215174 A1 | 9/1992 |
| WO | WO-9422108 A1 | 9/1994 |
| WO | WO-9517711 A1 | 6/1995 |
| WO | WO-9522800 A1 | 8/1995 |
| WO | WO-9634356 A1 | 10/1996 |
| WO | WO-9737315 A1 | 10/1997 |
| WO | WO-9746957 A1 | 12/1997 |
| WO | WO-9835468 A2 | 8/1998 |
| WO | WO-9918510 A1 | 8/1999 |
| WO | WO-9953422 A1 | 10/1999 |
| WO | WO-9959283 A2 | 11/1999 |
| WO | WO-9963461 A1 | 12/1999 |
| WO | WO-0025218 A1 | 5/2000 |
| WO | WO-0025223 A1 | 5/2000 |
| WO | WO-0032088 A1 | 11/2000 |
| WO | WO-0078557 A1 | 12/2000 |
| WO | WO-0141013 A1 | 6/2001 |
| WO | WO-0182107 A1 | 11/2001 |
| WO | WO-0195297 A1 | 12/2001 |

OTHER PUBLICATIONS

"U.S. Appl. No. 09/177,726, Non Final Office Action mailed Feb. 7, 2000", 4 pgs.

"U.S. Appl. No. 09/177,726, Non Final Office Action mailed Feb. 9, 2000", 2 pgs.

"U.S. Appl. No. 09/177,726, Non Final Office Action mailed Jul. 21, 1999", 6 pgs.

"U.S. Appl. No. 09/177,726, Notice of Allowance mailed Feb. 9, 2000", 3 pgs.

"U.S. Appl. No. 09/177,726, Notice of Allowance mailed Aug. 16, 1999", 2 pgs.

"U.S. Appl. No. 09/177,726, Response filed Aug. 31, 1899 to Non Final Office Action mailed Jul. 21, 1999", 3 pgs.

"U.S. Appl. No. 09/177,726, Response to 312 Amendment mailed Feb. 7, 2000", 4 pgs.

"U.S. Appl. No. 09/436,566, Final Office Action mailed Mar. 18, 2003", 6 pgs.

"U.S. Appl. No. 09/436,566, Non Final Office Action mailed Oct. 8, 2002", 8 pgs.

"U.S. Appl. No. 09/436,566, Notice of Allowance mailed Nov. 18, 2003", 8 pgs.

"U.S. Appl. No. 09/436,566, Preliminary Amendment filed Mar. 31, 2000", 13 pgs.

"U.S. Appl. No. 09/436,566, Response filed Feb. 10, 2003 to Non Final Office Action mailed Oct. 8, 2002", 14 pgs.

"U.S. Appl. No. 09/436,566, Response filed Mar. 18, 2003 to Final Office Action mailed Mar. 18, 2003", 5 pgs.

"U.S. Appl. No. 09/436,566, Supplemental Preliminary Amendment filed Mar. 8, 2002", 17 pgs.

"U.S. Appl. No. 09/542,464, Non Final Office Action mailed Jan. 23, 2001", 4 pgs.

"U.S. Appl. No. 09/542,464, Notice of Allowance mailed Apr. 6, 2001", 3 pgs.

"U.S. Appl. No. 09/542,464, Notice of Allowance mailed Nov. 5, 2001", 3 pgs.

"U.S. Appl. No. 09/542,464, Preliminary Amendment filed Apr. 4, 2000", 6 pgs.

"U.S. Appl. No. 09/542,464, Preliminary Amendment filed Oct. 23, 1998", 6 pgs.

"U.S. Appl. No. 09/589,585, Advisory Action mailed Mar. 26, 2009", 3 pgs.

"U.S. Appl. No. 09/589,585, Advisory Action mailed Apr. 4, 2007", 5 pgs.

"U.S. Appl. No. 09/589,585, Amended Appeal Brief filed Oct. 5, 2007", 28 pgs.

"U.S. Appl. No. 09/589,585, Appeal Brief filed May 22, 2007", 25 pgs.

"U.S. Appl. No. 09/589,585, Appeal Brief filed Jul. 6, 2009", 26 pgs.

"U.S. Appl. No. 09/589,585, Examiner Interview Summary mailed Apr. 1, 2008", 2 pgs.

"U.S. Appl. No. 09/589,585, Final Office Action mailed Jan. 6, 2009", 16 pgs.

"U.S. Appl. No. 09/589,585, Final Office Action mailed Nov. 16, 2006", 18 pgs.

"U.S. Appl. No. 09/589,585, Non-Final Office Action mailed Jan. 11, 2008", 16 pgs.

"U.S. Appl. No. 09/589,585, Non-Final Office Action mailed Jan. 12, 2005", 10 pgs.

"U.S. Appl. No. 09/589,585, Non-Final Office Action mailed Mar. 26, 2004", 9 pgs.

"U.S. Appl. No. 09/589,585, Non-Final Office Action mailed May 18, 2006", 16 pgs.

"U.S. Appl. No. 09/589,585, Non-Final Office Action mailed Aug. 23, 2005", 10 pgs.

"U.S. Appl. No. 09/589,585, Notice of Allowance mailed Oct. 13, 2009", 12 pgs.

"U.S. Appl. No. 09/589,585, Response filed Feb. 23, 2006 to Non-Final Office Action mailed Aug. 23, 2005", 13 pgs.

"U.S. Appl. No. 09/589,585, Response filed Mar. 6, 2009 to Final Office Action mailed Jan. 6, 2009", 11 pgs.

"U.S. Appl. No. 09/589,585, Response filed Mar. 7, 2007 to Final Office Action mailed Nov. 16, 2006", 13 pgs.

"U.S. Appl. No. 09/589,585, Response filed Apr. 11, 2008 to Non-Final Office Action mailed Jan. 11, 2008", 8 pgs.

"U.S. Appl. No. 09/589,585, Response filed Jun. 13, 2005 to Non-Final Office Action mailed Jan. 12, 2005", 17 pgs.

"U.S. Appl. No. 09/589,585, Response filed Jul. 16, 2004 to Non-Final Office Action mailed Mar. 26, 2004", 9 pgs.

"U.S. Appl. No. 09/589,585, Response filed Aug. 10, 2006 to Non-Final Office Action mailed May 18, 2006", 6 pgs.

"U.S. Appl. No. 09/589,585, Response filed Dec. 23, 2003 to Restriction Requirement mailed Nov. 25, 2003", 7 pgs.

"U.S. Appl. No. 09/589,585, Restriction Requirement mailed Nov. 25, 2003", 5 pgs.

"U.S. Appl. No. 09/589,585, Supplemental Notice of Allowability mailed Nov. 20, 2009", 11 pgs.

"U.S. Appl. No. 09/777,306, Advisory Action mailed Aug. 23, 2004", 3 pgs.

"U.S. Appl. No. 09/777,306, Final Office Action mailed Jun. 4, 2004", 9 pgs.

"U.S. Appl. No. 09/777,306, Non Final Office Action mailed Jan. 14, 2004", 8 pgs.

"U.S. Appl. No. 09/777,306, Non Final Office Action mailed Oct. 21, 2004", 6 pgs.

"U.S. Appl. No. 09/777,306, Notice of Allowance mailed Jun. 1, 2005", 4 pgs.

"U.S. Appl. No. 09/777,306, Notice of Allowance mailed Sep. 9, 2005", 4 pgs.

(56) References Cited

OTHER PUBLICATIONS

"U.S. Appl. No. 09/777,306, Preliminary Amendment filed Feb. 5, 2001", 8 pgs.
"U.S. Appl. No. 09/777,306, Preliminary Amendment filed Sep. 24, 2004", 15 pgs.
"U.S. Appl. No. 09/777,306, Preliminary Amendment filed Dec. 4, 2001", 14 pgs.
"U.S. Appl. No. 09/777,306, Response filed Feb. 22, 2005 to Non Final Office Action mailed Oct. 21, 2004", 7 pgs.
"U.S. Appl. No. 09/777,306, Response filed Apr. 13, 2004 to Non Final Office Action mailed Jan. 14, 2004", 15 pgs.
"U.S. Appl. No. 09/777,306, Response filed Jul. 30, 2004 to Non-Final Office Action mailed Jun. 4, 2004", 14 pgs.
"U.S. Appl. No. 09/777,306, Second Supplemental Preliminary Amendment filed Jan. 4, 2002", 16 pgs.
"U.S. Appl. No. 09/777,306, Second Supplemental Preliminary Amendment filed Jan. 4, 2002", 15 pgs.
"U.S. Appl. No. 09/777,306, Supplemental Preliminary Amendment filed Dec. 4, 2001", 15 pgs.
"U.S. Appl. No. 09/777,306, Third Preliminary Amendment filed Mar. 11, 2002", 17 pgs.
"U.S. Appl. No. 09/777,306, Third Preliminary Amendment filed Mar. 11, 2002", 16 pgs.
"U.S. Appl. No. 11/312,876, Final Office Action mailed Aug. 22, 2008", 6 pgs.
"U.S. Appl. No. 11/312,876, Final Office Action mailed Oct. 9, 2007", 5 pgs.
"U.S. Appl. No. 11/312,876, Non Final Office Action mailed Apr. 9, 2007", 5 pgs.
"U.S. Appl. No. 11/312,876, Non-Final Office Action mailed Apr. 28, 2008", 5 pgs.
"U.S. Appl. No. 11/312,876, Notice of Allowance mailed Oct. 24, 2008", 8 pgs.
"U.S. Appl. No. 11/312,876, Preliminary Amendment filed Dec. 20, 2005", 7 pgs.
"U.S. Appl. No. 11/312,876, Response filed Mar. 10, 2008 to Final Office Action mailed Oct. 9, 2007", 9 pgs.
"U.S. Appl. No. 11/312,876, Response filed Jun. 9, 2008 to Non-Final Office Action mailed Apr. 28, 2008", 11 pgs.
"U.S. Appl. No. 11/312,876, Response filed Aug. 9, 2007 to Non Final Office Action mailed Apr. 9, 2007", 10 pgs.
"U.S. Appl. No. 11/312,876, Response filed Oct. 7, 2008 to Final Office Action mailed Aug. 22, 2008", 7 pgs.
"U.S. Appl. No. 11/421,114, Final Office Action mailed Aug. 30, 2007", 6 pgs.
"U.S. Appl. No. 11/421,114, Non Final Office Action mailed Apr. 18, 2007", 7 pgs.
"U.S. Appl. No. 11/421,114, Non-Final Office Action mailed Dec. 20, 2007", 7 pgs.
"U.S. Appl. No. 11/421,114, Notice of Allowance mailed Apr. 23, 2008", 6 pgs.
"U.S. Appl. No. 11/421,114, Response filed Mar. 10, 2008 to Non-Final Office Action mailed Dec. 20, 2007", 15 pgs.
"U.S. Appl. No. 11/421,114, Response filed Jul. 16, 2007 to Non Final Office Action mailed Apr. 18, 2007", 21 pgs.
"U.S. Appl. No. 11/421,114, Response filed Oct. 31, 2007 to Final Office Action mailed Aug. 30, 2007", 20 pgs.
"U.S. Appl. No. 12/347,929, Non-Final Office Action mailed Sep. 20, 2010", 5 pgs.
"U.S. Appl. No. 12/347,929, Notice of Allowance mailed Nov. 10, 2010", 5 pgs.
"U.S. Appl. No. 12/347,929, Response filed Oct. 22, 2010 Non Final Office Action mailed Sep. 20, 2010", 9 pgs.
"U.S. Appl. No. 12/416,076, Examiner Interview Summary mailed Jun. 25, 2010", 3 pgs.
"U.S. Appl. No. 12/416,076, Non-Final Office Action mailed May 12, 2010", 11 pgs.
"U.S. Appl. No. 12/416,076, Notice of Allowance mailed Jul. 7, 2010", 7 pgs.
"U.S. Appl. No. 12/416,076, Response filed Jun. 22, 2010 to Non Final Office Action mailed May 12, 2010", 11 pgs.
"U.S. Appl. No. 12/620,450, Non Final Office Action mailed Feb. 21, 2012", 15 pgs.
"U.S. Appl. No. 12/620,450, Notice of Allowance mailed Aug. 15, 2012", 15 pgs.
"U.S. Appl. No. 12/620,450, Response filed May 14, 2012 to Non Final Office Action mailed Feb. 21, 2012", 14 pgs.
"U.S. Appl. No. 12/620,450, Response filed Jul. 19, 2012 to Restriction Requirement mailed Jul. 17, 2012", 8 pgs.
"U.S. Appl. No. 12/620,450, Restriction Requirement mailed Jul. 17, 2012", 6 pgs.
"U.S. Appl. No. 13/053,453, Non-Final Office Action Mailed Mar. 1, 2012", 5 pgs.
"U.S. Appl. No. 13/053,453, Notice of Allowance mailed Apr. 27, 2012", 5 pgs.
"U.S. Appl. No. 13/053,453, Preliminary Amendment filed Apr. 11, 2011", 17 pgs.
"U.S. Appl. No. 13/053,453, Response filed Apr. 18, 2012 to Non Final Office Action mailed Mar. 1, 2012", 9 pgs.
"U.S. Appl. No. 13/053,453, Response filed Dec. 19, 2011 to Restriction Requirement mailed Oct. 27, 2011", 8 pgs.
"U.S. Appl. No. 13/053,453, Restriction Requirement mailed Oct. 27, 2011", 4 pgs.
"U.S. Appl. No. 13/717,394, Final Office Action mailed Feb. 27, 2015", 9 pgs.
"U.S. Appl. No. 13/717,394, Non Final Office Action mailed Oct. 23, 201", 17 pgs.
"U.S. Appl. No. 13/717,394, Notice of Allowance mailed May 11, 2015", 8 pgs.
"U.S. Appl. No. 13/717,394, Response filed Jan. 23, 2015 to Non Final Office Action mailed Oct. 23, 2014", 19 pgs.
"U.S. Appl. No. 13/717,394, Response filed Apr. 27, 2015 to Final Office Action mailed Feb. 27, 2015", 9 pgs.
"Auction Universe Website", [Online]. Retrieved from the Internet: <URL: http://www.auctionuniverse.com>, (Oct. 23, 1998), 6 pgs.
"AuctionWatch.com", [Online]. Retrieved from the Internet: <URL: http://www.auction.com>, (Jan. 15, 2001), 17 pgs.
"Auctiva Showcase", [Online]. Retrieved from the Internet: <URL: http://www.auctiva.com>, (Jan. 15, 2001), 43 pgs.
"Australian Application Serial No. 2001275270, First Examiner's Report mailed Oct. 21, 2005", 3 pgs.
"Australian Application Serial. No. 2001275270, Response filed Apr. 20, 2007 to Office Action mailed Nov. 21, 2006", 15 pgs.
"Australian Application Serial No. 2001275270, Response filed Jul. 5, 2007 to Office Action mailed May 11, 2007", 4 pgs.
"Australian Application Serial No. 2001275270, Response filed Nov. 2, 2006 to Office Action mailed Oct. 21, 2005", 24 pgs.
"Australian Application Serial No. 2001275270, Second Examiner's Report mailed Nov. 21, 2006", 2 pgs.
"Australian Application Serial No. 2001275270, Third Examiner's Report mailed May 11, 2007", 2 pgs.
"Australian Application Serial No. 2004214578, Examiner's First Report mailed Mar. 7, 2007", 4 pgs.
"Australian Application Serial No. 2004214578, Response filed Jul. 12, 2007", 12 pgs.
"Australian Application Serial No. 2004214578, Response filed Aug. 1, 2007 ", 27 pgs.
"Australian Application Serial No. 2007234637, First Examiner Report mailed Mar. 13, 2009", 5 pgs.
"Australian Application Serial No. 2007234637, Response filed Aug. 4, 2009 to Examiner's Report mailed May 26, 2009", 15 pgs.
"Canadian Application Serial No. 2,347,812, Office Action mailed Jan. 9, 2008", 5 pgs.
"Creating an Executable Image using Program "Build Job"", [Online]. Retrieved from the Internet: <URL: http://www-cdf.fnal.gov/offline/a_c/cdf384/node7.html>, (Accessed Aug. 18, 2007), 1 pg.
"Development of Application is Directed to Web", ASCII NT vol. 1, No. 11., ASCII Network Technology, Japan, (Nov. 1998), 228-231 pgs.

(56) References Cited

OTHER PUBLICATIONS

"Disc Image—Wikpedia definition", [Online]. Retrieved from the Internet: <URL: http://en.wikipedia.org/wiki/Disk_image>, (Accessed Aug. 18, 2007), 8 pgs.
"European Application Serial No. RS 102472, European Search Report mailed Apr. 9, 1999", (Apr. 9, 1999), 4 pages.
"European Application Serial No. 01941962.1, Appeal Decision mailed Mar. 11, 2015", 16 pgs.
"European Application Serial No. 01941962.1, EPO Written Decision to Refuse mailed Mar. 11, 2010", 17 pgs.
"European Application Serial No. 01941962.1, Office Action mailed Jul. 17, 2008", 8 pgs.
"European Application Serial No. 01941962.1, Oral Proceedings mailed Feb. 25, 2015", 3 pgs.
"European Application Serial No. 01941962.1, Response filed Nov. 27, 2008 to Office Action mailed Jul. 17, 2008", 3 pgs.
"European Application Serial No. 01941962.1, Response filed: Jul. 30, 2010", 34 pgs.
"European Application Serial No. 01941962.1, Summons to Attend Oral Proceedings mailed Nov. 6, 2014", 8 pgs.
"European Application Serial No. 01941962.1, Supplementary Search Report mailed Mar. 9, 2007", 8 pgs.
"European Application Serial No. 1941962, Extended European Search Report mailed Aug. 9, 2006", 5 pgs.
"European Application Serial No. 1941962.1, European Search Report mailed Aug. 24, 2006", 6 pgs.
"Frontier Scripting: What's Here?", [Online]. Retrieved from the Internet: <URL: http://www.spinwardstars.com/frontier/>, (Archived Aug. 31, 2000), 2 pgs.
"International Application Serial No. 01/12398, International Search Report mailed Aug. 27, 2001", 1 pg.
"International Application Serial No. PCT/US/00/17136, International Search Report mailed Aug. 27, 2001", 2 pgs.
"International Application Serial No. PCT/US01/18225, International Preliminary Examination Report mailed Nov. 18, 2000", 5 pgs.
"International Application Serial No. PCT/US01/18225, International Search Report mailed Sep. 5, 2001", 1 pg.
"International Application Serial No. PCT/US99/18510, International Search Report mailed Oct. 29, 1999", 4 pgs.
"International Application Serial No. PCT/US99/18510, International Search Report mailed Oct. 29, 1999", 1 pg.
"Japanese Application Serial No. 02-502756, Final Office Action mailed Jun. 10, 2010", with English translation of claims, 5 pgs.
"Japanese Application Serial No. 2002-502756, Amendment filed Dec. 7, 2007", 9 pgs.
"Japanese Application Serial No. 2002-502756, Final Office Action mailed Aug. 4, 2011", 16 pgs.
"Japanese Application Serial No. 2002-502756, Office Action mailed Mar. 10, 2011", with English translation of claims, 18 pgs.
"Japanese Application Serial No. 2002-502756, Office Action Response Oct. 10, 2010", 13 pgs.
"Japanese Application Serial No. 2002-502756, Response filed Jul. 11, 2011 to Office Action mailed Mar. 23, 2011", 13 pgs.
"Japanese Application Serial No. 2002-502756, Response filed Dec. 5, 2011 to Final Office Action mailed Aug. 4, 2011", 28 pgs.
"Javascript Handout 2", Hypermedia Production, (Fall 1998), 3 pgs.
"Korean Application Serial No. 2002-7016733, Final Office Action mailed Nov. 28, 2007", 4 pgs.
"Korean Application Serial No. 2002-7016733, Grounds for Rejection mailed Apr. 18, 2007", 7 pgs.
"Korean Application Serial No. 2002-7016733, Response filed Jan. 28, 2008 to Final Office Action mailed Nov. 28, 2007", 22 pgs.
"Korean Application Serial No. 2002-7016733, Response filed Jul. 18, 2007 to Office Action mailed Apr. 18, 2007", 30 pgs.
"Korean Application Serial No. 2002-7016733, Trial Decision mailed May 13, 2008", 16 pgs.
"Netgrocer Website", [Online]. Retrieved from the Internet: <URL: http://www.netgrocer.com>, (Oct. 23, 1998), 3 pgs.

"Onsale Auction Website", [Online]. Retrieved from the Internet: <URL: http://www.onsale.com>, (Oct. 23, 1998), 3 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"Posting images on Auction Web", [Online]. Retrieved from the Internet: <URL: http://web.archive.org/web/19980503163306/pongo.com/tutorials/aweb-images/>, (Archived May 3, 1998), 2 Pages.
"System Image—Wikpedia definition", [Online]. Retrieved from the Internet: <URL: http://en.wikipedia.org/wiki/System_image>, (Downloaded Aug. 18, 2007), 2 pgs.
"Welcome to ONSALE Online Auction Supersite", [Online]. Retrieved from the Internet: <URL: http://web.archive.org/web/19980212000633/http://www.onsale.com/>, (Feb. 12, 1998).
"Whatever your treasure online picture sell it better", PixHost.com © 1998 WebForSuccess, [Online]. Retrieved from the Internet: <URL: http://web.archive.org/web/19981202192135/http:www.pixhost.com/>, (Archived May 8, 1999), 17 Pages.
"Yahoo Auctions Website", [Online]. Retrieved from the Internet: <URL: http://auctions.yahoo.com>, (Oct. 23, 1998), 5 pgs.
Baumann, G. W, "Personal Optimized Decision/Transaction Program", IBM Technical Disclosure Bulletin, (Jan. 1995), 83-84.
Business Wire, "Mediappraise Receives National Award for Web-based Technology That Enables Companies to Solve Thorny HR Problem", Business Wire, (Dec. 14, 1998), 1-2.
Clemons, E., "Evaluating the prospects for alternative electronic securities", Proceedings of ICIS 91: 12th International Conference on Information Systems, (Dec. 16-18, 1991), 53-63.
Gimenez-Funes, E., et al., "Designing Bidding Strategies for Trading Agents in Electronic Auctions", Artificial Intelligence Research Institute, IIIA, (Jul. 1998), 136-143.
Graham, Ian, "The Emergence of Linked Fish Markets in Europe", Electronic Markets. vol. 8, No. 2, (1998), 29-32.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-275.
Hirokazu, T., "Creation of Dynamic Homepage Using Java Applet-Let's Use Electric Bulletin Board!!", Let's Create an attractive Home page vol. 3, Japan, (Published before Jun, 10, 2010), 145-152 pgs.
Hong, Zhou, "Multilingual information retrieval system", Proc. SPIE, vol. 2916, Multimedia Storage and Archiving Systems, C.-C. J. Kuo; Ed., (Nov. 1996), 33-44.
Kernz, James J., "Apparatus and Method for Certified Coin Image Compilation", Application U.S. Appl. No. 60/076,380, filed Feb. 26, 1998, 18 pgs.
Klein, Stefan, "Introduction to Electronic Auctions", EM—Electronic Auctions. EM—Electronic Markets, vol. 7, No. 4, (Dec. 1997), 3-6.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Liepins, P. J, "A browser based image bank, useful tool or expensive toy?", Med Inform, 23(3), (Jul.-Sep. 1998), 199-206.
Maller, J., "Random Images with Javascript", Javascript Image Replacement (online), http://www.joemaller.com/business/webtcools/javascript/random_image.html, (May 1, 1997), 14.
Malone, T., et al., "Electronic Markets and Electronic Hierarchies", Communications of the ACM, vol. 30, No. 6, (Jun. 1987), 484-497.

(56) References Cited

OTHER PUBLICATIONS

Manabu, Nagai, "Challenger, Rakuten Market, "easy EC" from fifty thousand Yen par a month, one hundred stores are stood side by side", Nikkei Multimedia, Nikkei BP, No. 32, (Feb. 15, 1998), 78-83 pgs.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Mohan, Rakesh, "Text-based search of TV news stories", SPIE, vol. 2916, Multimedia Storage and Archiving Systems, C.-C. J. Kuo; Ed., (Nov. 1996), 2-13.

Neo, B. S, "The implementation of an electronic market for pig trading in Singapore", Journal of Strategic Information Systems; vol. 1(5), (Dec. 1992), 278-288.

Padmanabhan, V. N, et al., "Using Predictive Prefetching to improved world wide web latency", ACM SIGCOMM Computer Communication Review, 26(3), (1996), 22-36.

Post, D. L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1998), 11-18.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Reynolds, S., "htmlGallery Suite", Frontier Scripting (online), [Online]. Retrieved from the Internet: <URL: http://www.spinwardstars.com/frontier/f4/gallery.html>, (Feb. 16, 1999), 1-7.

Reynolds, S., "htmlImage Suite (F4)", Frontier Scripting (Online), [Online]. Retrieved from the Internet: <URL: http://www.spinwardstars.com/frontier/f4/htmlimage.html>, (May 23, 1999), 1-23.

Reynolds, S., "Randomizer Suite: About Randomizer", Frontier Scripting (Online), [Online]. Retrieved from the Internet: <URL: http://www.spinwardstars/frontier/suiters/randonizer.html>, (Aug. 3, 1999), 1-5.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tatabe, T., et al., "The open image database GIRLS aiming at mediating Multimedia data on the internet", Report of Information Processing Society of Japan, 96(62), (Jun. 11, 1966), 37-42.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-16.

Zwass, V., "Electronic Commerce: Structures and Issues", International Journal of Electronic Commerce, Fall 1996, vol. 1, No. 1, (Fall 1996), 3-23.

AUTOMATED SELECTION OF IMAGES FOR WEB PAGES

CROSS-REFERENCE TO RELATED APPLICATIONS

This application is a continuation application of U.S. application Ser. No. 13/717,394, filed on Dec. 17, 2012, entitled "Automated Selection of Images for Web Pages," now issued as U.S. Pat. No. 9,116,868, which is a continuation application of U.S. application Ser. No. 12/620,450, filed on Nov. 17, 2009, entitled "Dynamic Selection of Images for Web Pages," now issued as U.S. Pat. No. 8,335,983, which is a divisional application of U.S. application Ser. No. 09/589,585, filed on Jun. 7, 2000, entitled "Dynamic Selection of Images for Web Pages," now issued as U.S. Pat. No. 7,673,229, all of which applications are incorporated herein by reference in their entireties.

FIELD OF THE INVENTION

This invention relates generally to content displayed as pages on the World Wide Web, and more particularly to selecting images as part of such content.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, eBay Inc., All Rights Reserved.

BACKGROUND OF THE INVENTION

Images are frequently used on World Wide Web (web) pages as illustration and to make the pages more attractive. Both purposes are particularly important when the Web site displaying the pages is a business. A user is more likely to explore a web site that shows images of the items for sale. In a Web-based business, such as an auction site, in which the inventory turns over rapidly, regenerating one or more web pages to display new images is especially important. However, choosing the new images to display is currently a manual process and thus cannot be accomplished as rapidly as may be desirable. Furthermore, once the images are selected, they must be integrated with the other content on the web page. Therefore, it would be advantageous to provide for the dynamic selection of images for web pages and for the automatic integration of the selected images to permit frequent and rapid modifications of the web pages.

SUMMARY OF THE INVENTION

The above-mentioned shortcomings, disadvantages and problems are addressed by the disclosed subject matter, which will be understood by reading and studying the following specification.

In various embodiments disclosed herein, a gallery widget provides for the automatic selection and integration of images in a markup language document, such as a web page. A widget tag may be encoded on the web page that invokes the gallery widget when the page is being processed for display. The gallery widget is a utility program that selects a pre-determined number of images from a group of images and places the images on the web page. The number of images and their respective locations on the web page may be specified in the widget tag. The gallery widget can select the images from a gallery that contains all available images or from a pool of images created from the gallery using a gallery administration tool.

Because the gallery widget is automatically invoked when the page is being readied for display, there is no manual intervention required so web pages encoded with the widget tag can be regenerated as frequently as necessary to maintain current images on the pages. When it is desirable to choose certain types of images during a time period, such as for promotional purposes, the gallery administration tool allows a user to create a pool of images having common characteristics in advance.

The disclosed subject matter describes systems, methods, and computer-readable media of varying scope. In addition to the aspects and advantages of the subject matter described in this summary, further aspects and advantages of the subject matter will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

An overview of a network-based transaction facility in which embodiments of the invention may be practiced is first described to provide a context for the invention. Next the operations and methods of the invention are described in conjunction with block diagrams and flowcharts. An exemplary computer hardware and software environment suitable for use with the invention are then described. Finally a conclusion of the detailed description is presented.

Transaction Facility

Figure 1:
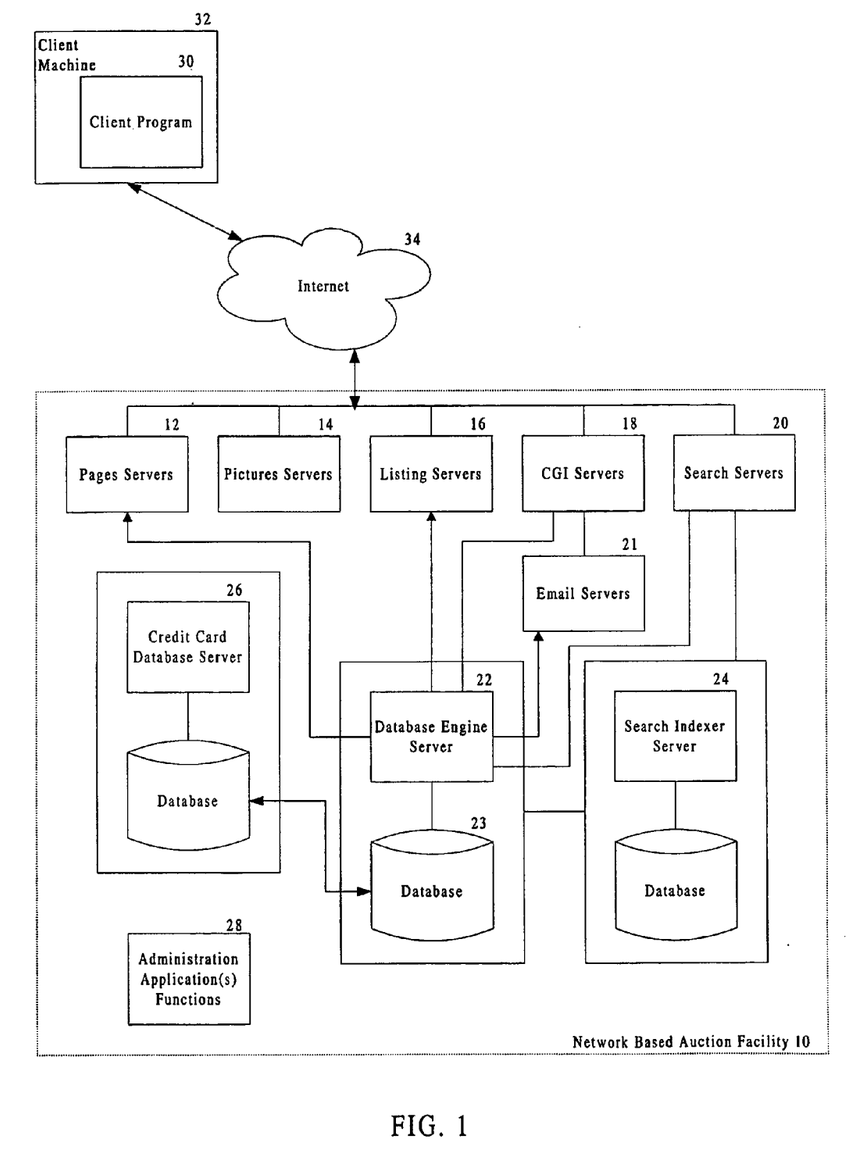
FIG. 1 is a diagram of one embodiment of a transaction facility suitable for practicing the present invention.

The following description of FIG. 1 is intended to provide an overview of a network-based transaction facility (e.g., business-to-business, business-to-consumer and consumer-to-consumer Internet marketplaces and retailers) but is not intended to limit the applicable computer environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. For the purposes of the present specification, the term "transaction" shall be taken to include any communications between two or more entities and shall be construed to include, but not be limited to, commercial transactions including sale and purchase transactions, auctions and the like. While exemplary embodiments of the present invention is described within the context of an Internet auction facility 10 as shown in FIG. 1, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within web pages, listing servers 16, CGI servers 18 that provide an intelligent interface to the back-end of facility 10, and search servers 20 that handle search requests to the facility 10. E-mail servers 21 provide automated e-mail communications to users of the facility 10 and other services as known in the art.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

The client and server machines are described in conjunction with FIG. 5 below.

Operational Overview

A system level overview of the operation of two embodiments of the invention are described by reference to FIGS. 2A and 2B. Images available for display on web pages are stored in a data structure 201, also referred to as a Gallery™ (Gallery is a trademark of eBay Inc., of San Jose, Calif., assignee of the present invention). A web page 205 is encoded with an instruction or "widget tag" that invokes a utility program 203, referred to as a "gallery widget", when the web page 205 is being prepared for display.

Figure 2A:
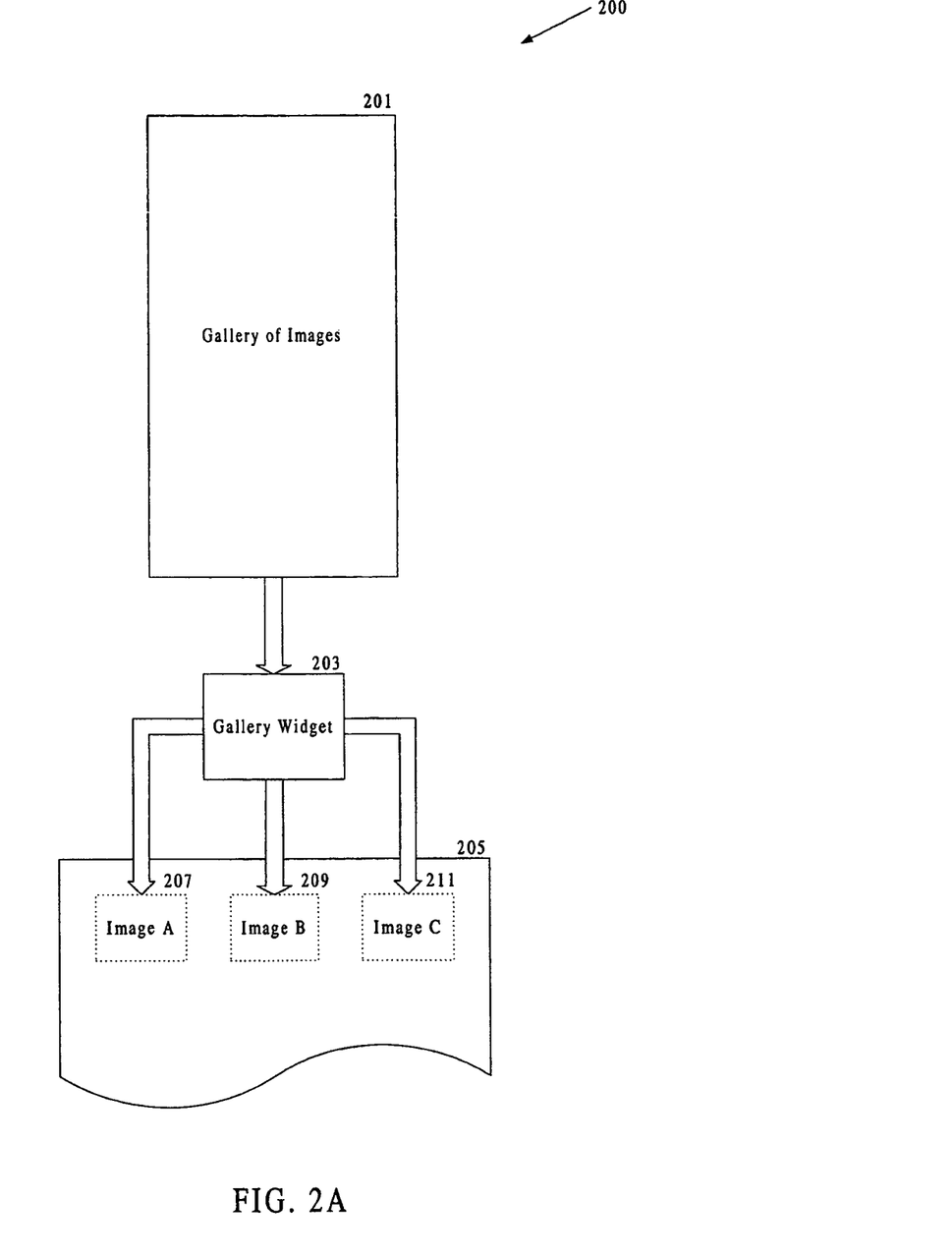
FIGS. 2A-B are block diagrams illustrating two embodiments of the invention.

In the embodiment illustrated in FIG. 2A, when the gallery widget 203 is invoked, it randomly selects a number of images specified in the widget tag from the Gallery 201 and places them on the web page 205 at locations 207, 209, 211 as defined in the widget tag.

When used in conjunction with the auction facility 10 shown FIG. 1, the gallery 201 is a set of thumbnail image records stored in a data base, such as data base 23. Each thumbnail image record contains data associated with an auction item represented by the image, such as an identifier for the item, a category for the item, a date and time for the end of the auction for the item, and an address for the image itself. The widget tag is encoded on the web page 205 in a proprietary format that identifies the gallery widget, specifies the number of images required, and defines the display parameters for the images. Additional parameters, such as a category identifier for the images, can also be included. At periodic intervals, the web page 205 is regenerated by compiling the page source code into standard HTML code suitable for display by a browser, such as Internet Explorer. When the compiler processes the widget tag, it invokes the gallery widget 203 to select the images for the page 205. Thus, for example, when a web home page contains a widget tag of the format, <Home Page Gallery, categoryID=M, numitems=N, picwidth=X, picheight=Y, picspace=Z, numrows=R, numcols=C>, the text "Home Page Gallery" identifies which gallery widget should be invoked when the home page is compiled, M identifies a particular category of images to be displayed on the home page, N specifies the number of images, and the combination of X, Y, Z, R and C defines the coordinates on the home page for the image locations.

Figure 2B:
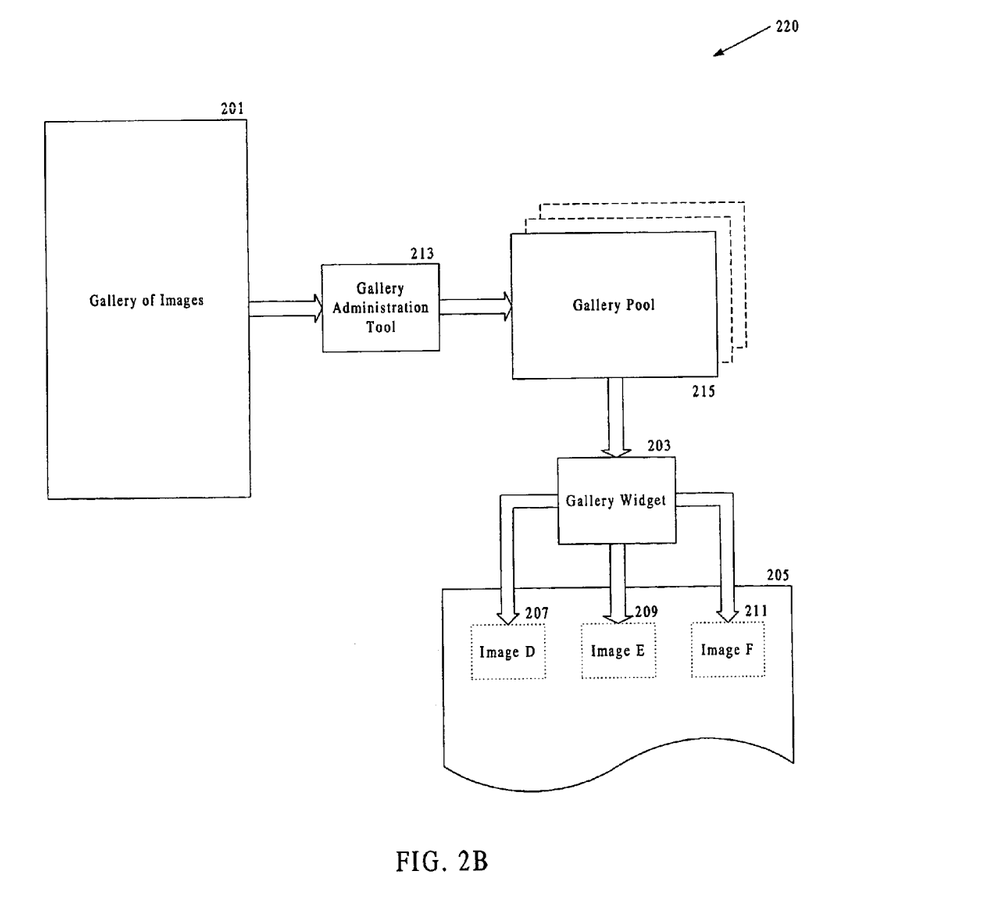

In an alternate embodiment illustrated in FIG. 2B, a gallery administration tool 213 pre-selects a certain number of images from the Gallery 201 to form a gallery pool data structure 215. The gallery administration tool 213 compares the images in the gallery 201 with various filtering criteria and allocates those images that meet the filtering criteria to the gallery pool 215. When the web page 205 is being prepared for display, the gallery widget 203 selects the required number of images from the gallery pool 215 rather than from the full Gallery 201. The gallery pool 215 may be used to hold images having common criteria, such as an expiration date or category. More than one image pool 215 can be created, as shown in phantom in FIG. 2B.

When used in conjunction with the auction facility 10 of FIG. 1, the gallery administration tool 211 is periodically executed by a user to choose the images for the pool 203 that will be available for display during the next time period based on filtering criteria input by the user. The criteria may be predicated on the occurrence of a special promotion or a particular theme such as a holiday. So, for example, a marketing employee could choose a large number of appropriate holiday images to fill the pool but would not have to know exactly how many images may be used. The user is also given the option of deleting individual items from the image pool 203 and for purging all images associated with items no longer at auction. Information from the Gallery thumbnail image records that match the filtering criteria are used to create the set of gallery pool records.

The system level overview of the operation of an embodiment of the invention has been described in this section of the detailed description. A gallery widget has been described that automatically selects and places images on a web page when a widget tag encoded on the web page invokes the widget. The gallery widget can select the images from a Gallery data structure containing all available images or from one or more gallery image pool data structures created by a gallery administration tool using pre-determined filtering criteria. While the invention is not limited to any particular widget tag, for sake of clarity a specific tag format has been described. It will be appreciated that the description of the invention in terms of a web page encompasses all documents written in any markup language.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media) If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 3A:
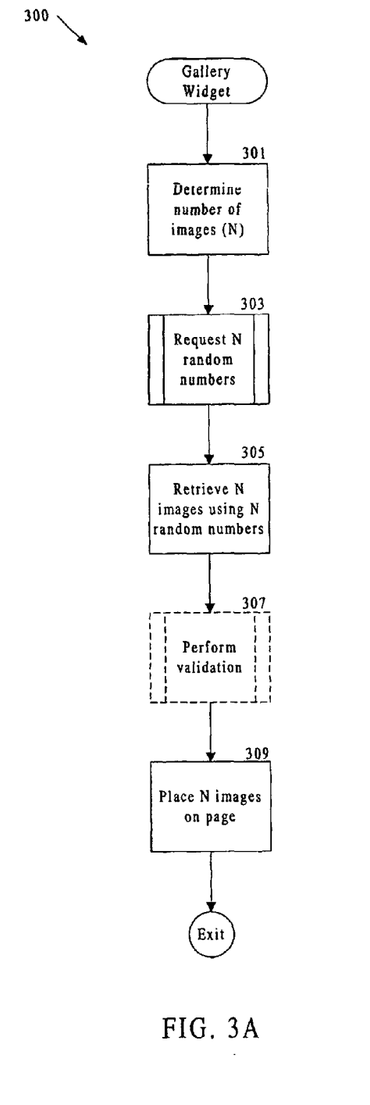
FIGS. 3a-B are flowcharts of a gallery widget method to be performed by a computer according to an embodiment of the invention.

Referring first to FIG. 3A, the acts to be performed by a computer executing a gallery widget method 300 are shown. When the gallery widget is invoked during the preparation of a web page, the method 300 determines the number of images (N) specified in the gallery widget tag (block 301) and calls a random number generator, such as one commonly provided by computer operating system, requesting N random numbers (block 303). The method 300 retrieves N images using each random number as an index into either the Gallery or the gallery pool data structure (block 305). The determination to use the Gallery or one of the gallery pools may be coded in the widget or may be driven by an additional parameter in the widget tag. The retrieved images are then placed on the page at the locations specified in the gallery widget tag (block 309).

Figure 3B:
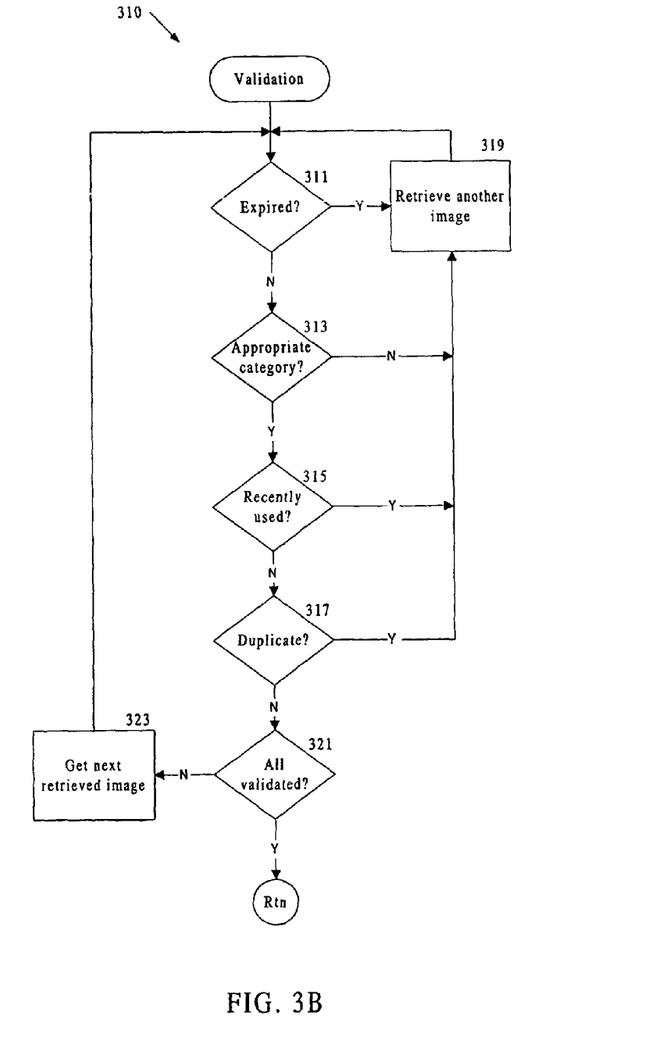

In an alternate embodiment also illustrated in FIG. 3A, the method 300 can perform an optional validation method on the images retrieved (block 307, shown in phantom). An embodiment of such a validation method 310 illustrated in FIG. 3B validates each of the images against four criteria. If the image has expired (block 311), is not an appropriate category (block 313), has been recently used (block 315), or is a duplicate of an already selected image (block 317), then another image is retrieved from either the Gallery or gallery pool to replace it (block 319). Once all images have been evaluated (blocks 321, 323), the validation method 310 returns to the gallery widget method 300. It will be appreciated that fewer or more than four criteria can be incorporated into a validation method without exceeding the scope of the invention.

Figure 4:
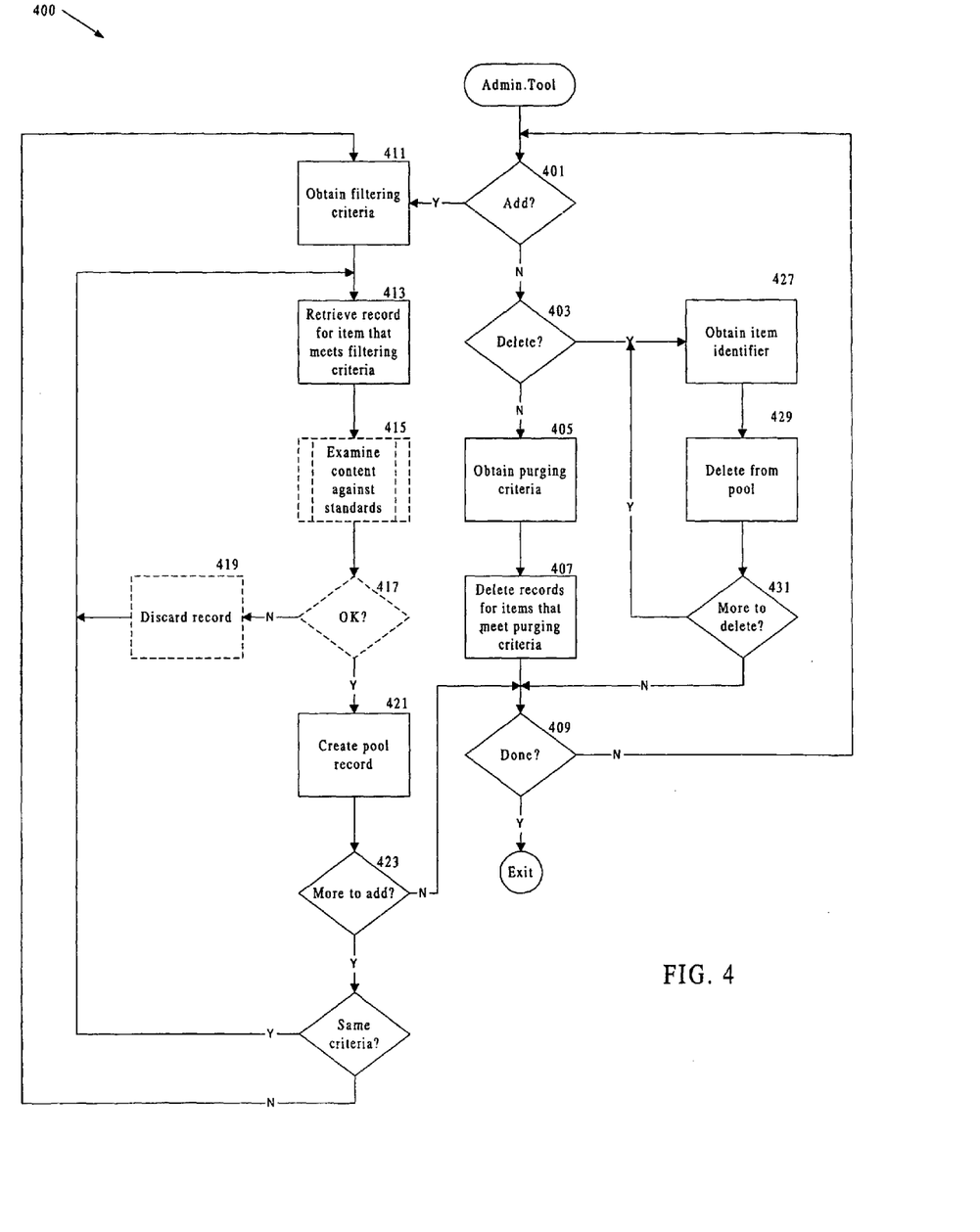
FIG. 4 is a flowchart of a gallery administration tool method to be performed by a computer according to an embodiment of the invention.

Turning now to FIG. 4, one embodiment of a gallery administration tool method 400 is described. The administration tool method 400 allows a user to add (block 401) or delete (block 403) individual image records, or purge an entire group of records from the gallery pool. When the user has completed all desired work on the pool (block 409), the method 400 exits.

If the user wishes to add an image record to the pool, he/she inputs filtering criteria (block 411), which is used to retrieve a matching record from the Gallery (block 413). The appropriate information from the Gallery record is used to create a corresponding record in the image pool (block 421). As many additional matching records can be added by user as desired (block 423) or new filtering criteria can be input (block 425).

The blocks in phantom in FIG. 4 illustrates an embodiment of the gallery administration tool that screens the selected image (block 415) to prevent, for example, an image with an offensive title from being displayed. Any image that fails the screening (block 417) is discarded (block 419) and another image selected (block 413). The screening at block 415 can be automatic based on some pre-determined standards or can be performed manually by the user.

When the user wants to delete individual images from the pool, an identifier for the image record (e.g. the identifier for the item represented by the image) is obtained from the user (block 427). The corresponding image is then deleted from the pool (block 429). If there are more images to delete (block 431), the user is given the opportunity to input another image record identifier.

The pool may need to be purged of images periodically, such as when the items represented by the images are not longer available on the web site. The user inputs purging criteria (block 405) and administration tool method 400 identifies and deletes the matching records (block 407).

One of skill in the art will immediately appreciate that while the administration tool has been described as an interactive program, the method 400 is equally applicable to being executed as a batch program driven by a set of parameters previously input by a user.

The particular methods performed by computer implementing an embodiment of the gallery widget and gallery administration tool have been described. The method performed for the gallery widget has been shown by reference to flowcharts in FIGS. 3A-B including all the acts from 301 until 323. The method performed for the gallery administration tool has been shown by reference to a flowchart in FIG. 4 including all the acts from 401 until 431.

Operating Environment

Figure 5:
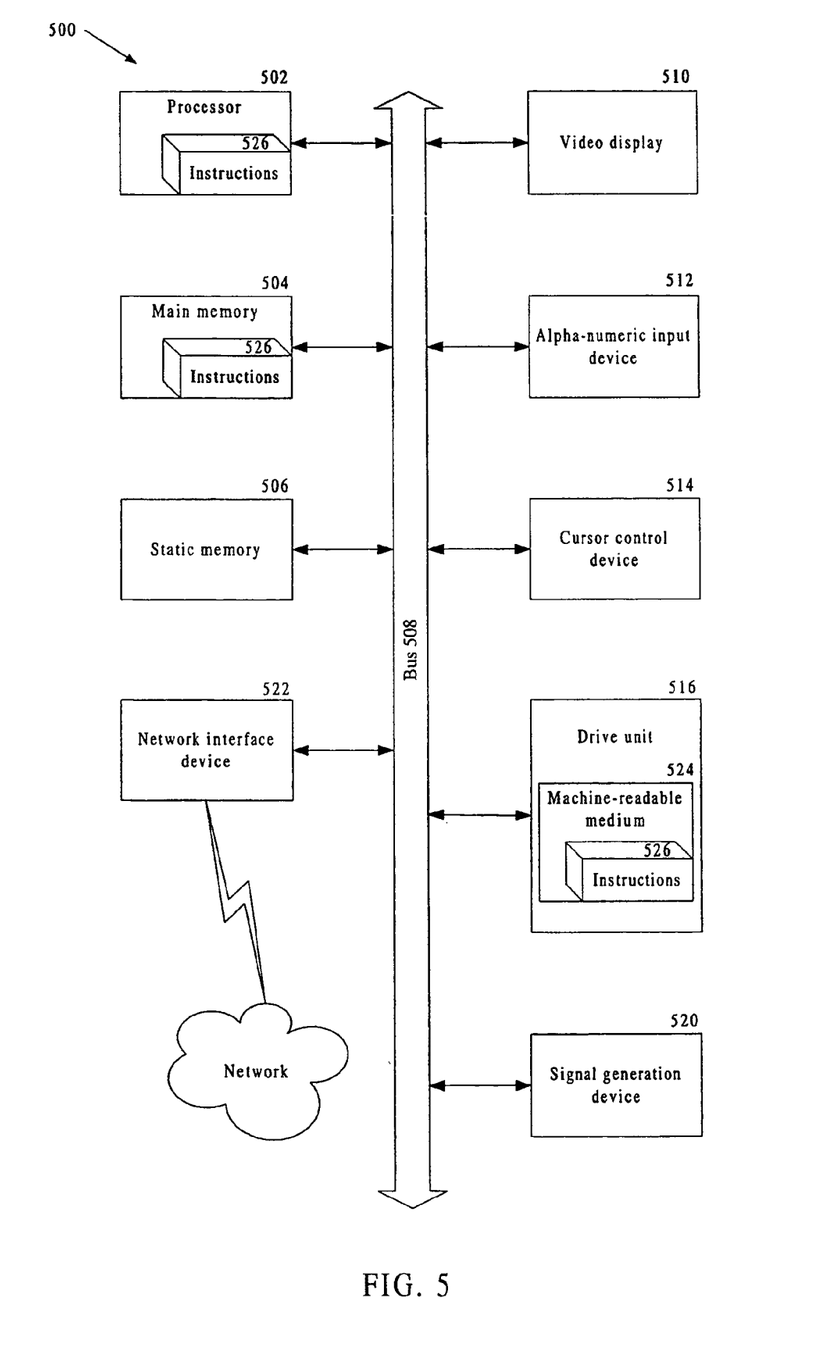
FIG. 5 is a diagram of one embodiment of a hardware and software operating environment suitable for practicing the present invention.

The following description of FIG. 5 is intended to provide an overview of computer hardware and other operating components suitable for implementing the invention, but is not intended to limit the applicable environments. FIG. 5 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

FIG. 5 shows one example of a conventional computer system that can be used as client or server machines. The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alpha-numeric input device 512

(e.g. a keyboard), a cursor control device 514 (e.g. a mouse), a disk drive unit 516, a signal generation device 520 (e.g. a speaker) and a network interface device 522, such as a modem.

The disk drive unit 516 represents non-volatile storage such as a magnetic hard disk, an optical disk, or another form of storage for large amounts of data, and includes a machine-readable medium 524 on which is stored a set of instructions (i.e., software) 526 embodying any one, or all, of the methodologies described above. The software 526 is also shown to reside, completely or at least partially, within the main memory 504 and/or within the processor 502 such as when it is written, often by a direct memory access process, into the main memory 504 during execution of the software by the processor 502. One of skill in the art will immediately recognize that the term "machine-readable medium" includes any type of storage device capable of storing or encoding a sequence of instructions for execution by the processor 502 that causes the machine to perform any one of the methodologies of the present invention. The term "machine-readable medium" (or "computer-readable") shall accordingly be taken to include, but not be limited to, solid-state memories, optical and magnetic disks, and carrier wave signals that encode data signals such as when the software 526 is transmitted or received via the network interface device 522 from/to external systems.

It will be appreciated that the modem or network interface device 522 can be considered to be part of the computer system 500. This interface device 522 can be an analog modem, ISDN modem, cable modem, token ring interface, satellite transmission interface (e.g. "Direct PC"), or other interfaces for coupling a computer system to other computer systems. The computer system 500 and the external systems can be connected in a local area network (LAN) configuration or in a wide-area network WAN configuration (generically represented as network 523). The LAN and WAN can be either public or private networks. One of the most widely used public WANs is the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web. The physical connections of the Internet and the protocols and communication procedures of the Internet are well known to those of skill in the art.

It will be appreciated that the computer system 500 is one example of many possible computer systems which have different architectures. For example, personal computers based on an Intel microprocessor often have multiple buses, one of which can be considered to be a peripheral bus. Network computers are another type of computer system that can be used with the present invention. Network computers do not usually include a hard disk or other mass storage, and the executable programs are loaded from a network connection into the memory 504 for execution by the processor 502. A Web TV system, which is known in the art, is also considered to be a computer system according to the present invention, but it may lack some of the features shown in FIG. 5, such as certain input or output devices. A typical computer system will usually include at least a processor, memory, and a bus coupling the memory to the processor.

It will also be appreciated that the computer system 500 is controlled by operating system software which includes a file management system, such as a disk operating system, which is part of the operating system software. One example of an operating system software with its associated file management system software is the operating system known as Windows '95® from Microsoft Corporation of Redmond, Wash., and its associated file management system. The file management system is typically stored in the non-volatile storage 516 and causes the processor 502 to execute the various acts required by the operating system to input and output data and to store data in memory, including storing files on the non-volatile storage 516.

CONCLUSION

A gallery widget that provides for the automatic selection and integration of images on markup language documents, such as web pages, has been described. In one aspect, the gallery widget selects the images from a gallery containing all the available images. In another aspect, a supporting gallery administration tool creates a pool of images from those in the gallery and the gallery widget selects the images for the web pages from the pool. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, one of skill in the art will immediately recognize that the invention is not limited to use with an auction web site as described herein, but is suitable for use on with any web-based business that requires a frequent rotation of images on its web site pages. Furthermore, although the invention has been described in conjunction with its use on the World Wide Web, it will be appreciated that the invention is equally applicable in any environment in which images are presented to a user in documents written in a markup language, and that the terminology used in this application is meant to include all environments that incorporate a markup language. Therefore, it is manifestly intended that this invention be limited only by the following claims and equivalents thereof.

What is claimed is:

1. A method of selecting images for a markup language document, the method comprising:
    determining a pre-determined number, N, of images to display in the markup language document;
    encoding an instruction in the markup language document to be executed by one or more hardware-based processors to select N images for insertion into the markup language document;
    retrieving the N images from a group of images; and
    placing the N retrieved images in the markup language document,
    wherein selecting the N images includes:
        obtaining filtering criteria;
        identifying an image from all available images based on the filtering criteria; and
        adding the identified image to the group of images.

2. The method of claim 1, further comprising placing the N retrieved images in the markup language document at one or more respective locations defined in the instruction, the N images to be displayed on one or more web pages.

3. The method of claim 1, further comprising selecting the images from the group of images that have been previously stored in a data structure, the data structure including data associated with the item including an identifier of the image and a category for the image.

4. The method of claim 1, further comprising automatically regenerating a new set of N images to be placed in the markup language document at periodic intervals.

5. The method of claim 1, further comprising: requesting N random numbers from a random-number generator; and retrieving the N images using the N random numbers.

6. The method of claim 1, further comprising:
examining information associated with an identified image of the N images against a set of standards; and
based on a determination that the information does not meet at least a portion of the set of standards, discarding the identified image.

7. The method of claim 6, further comprising substituting a different image for the discarded image.

8. The method of claim 1, wherein the markup language document is a web page and the instruction is a tag in a proprietary format.

9. The method of claim 8, wherein the proprietary format comprises a widget identifier and one or more display parameters.

10. The method of claim 9, wherein the one or more display parameters comprise a size parameter and a location parameter.

11. The method of claim 1, further comprising: validating the N images against validation criteria; and based on a determination that an image fails the validation criteria, substituting a different image for the failed image.

12. A tangible machine-readable storage medium having no transitory signals and storing a set of instructions that, when executed by one or more hardware-based processors, causes the one or more processors to perform operations to select images for a markup language document, the operations comprising:
determining a pre-determined number, N, of images to display in the markup language document;
encoding an instruction in the markup language document to be executed by the one or more hardware-based processors to select N images for insertion into the markup language document;
retrieving the N images from a group of images; and
placing the N retrieved images in the markup language document,
wherein selecting the N images includes further operations comprising:
obtaining filtering criteria;
identifying an image from all available images based on the filtering criteria; and
adding the identified image to the group of images.

13. The tangible machine-readable storage medium of claim 12, wherein the operations further comprise placing the N retrieved images in the markup language document at one or more respective locations defined in the instruction, the N images to be displayed on one or more web pages.

14. The tangible machine-readable storage medium of claim 12, wherein the operations further comprise automatically regenerating a new set of N images to be placed in the markup language document at periodic intervals.

15. The tangible machine-readable storage medium of claim 12, wherein the operations further comprise:
requesting N random numbers from a random-number generator; and
retrieving the N images using the N random numbers.

16. The tangible machine-readable storage medium of claim 12, wherein the operations further comprise:
validating the N images against validation criteria; and
based on a determination that an image fails the validation criteria, substituting a different image for the failed image.

* * * * *

UNITED STATES PATENT AND TRADEMARK OFFICE
CERTIFICATE OF CORRECTION

PATENT NO. : 9,477,773 B2
APPLICATION NO. : 14/834152
DATED : October 25, 2016
INVENTOR(S) : Pearson et al.

It is certified that error appears in the above-identified patent and that said Letters Patent is hereby corrected as shown below:

On the Title Page

On page 3, in Column 1, under "Other Publications", Line 25, delete "Mar. 18, 2003" and insert --May 16, 2003--, therefor On page 4, in Column 2, under "Other Publications", Line 27-28, delete "Oct. 23, 201"," and insert --Oct. 23, 2014",--, therefor On page 4, in Column 2, under "Other Publications", Line 60, delete "Mar. 13, 2009"," and insert --May 13, 2009",--, therefor On page 5, in Column 1, under "Other Publications", Line 1, delete "Image-Wikpedia" and insert --Image-Wikipedia--, therefor On page 5, in Column 1, under "Other Publications", Line 9, delete "Mar. 11, 2010"," and insert --Mar. 30, 2010",--, therefor On page 5, in Column 1, under "Other Publications", Line 51, delete "Oct. 10, 2010"," and insert --Nov. 10, 2010",--, therefor On page 5, in Column 2, under "Other Publications", Line 14, delete "image-Wikpedia" and insert --Image-Wikipedia--, therefor Signed and Sealed this
Eighth Day of May, 2018

Andrei Iancu
*Director of the United States Patent and Trademark Office*